US008688150B2

(12) United States Patent
Mumick et al.

(10) Patent No.: US 8,688,150 B2
(45) Date of Patent: Apr. 1, 2014

(54) METHODS FOR IDENTIFYING MESSAGES AND COMMUNICATING WITH USERS OF A MULTIMODAL MESSAGE SERVICE

(75) Inventors: Inderpal Singh Mumick, Berkley Heights, NJ (US); Ewald Anderl, Middletown, NJ (US); Raja Moorthy, Fairless Hills, NJ (US); Prasanna Uppaladadium, Edison, NJ (US)

(73) Assignee: Kirusa Inc., New Providence, NJ (US)

( * ) Notice: Subject to any disclaimer, the term of this patent is extended or adjusted under 35 U.S.C. 154(b) by 1284 days.

(21) Appl. No.: 10/589,325

(22) PCT Filed: Aug. 12, 2005

(86) PCT No.: PCT/US2005/028865
§ 371 (c)(1),
(2), (4) Date: May 4, 2007

(87) PCT Pub. No.: WO2006/020938
PCT Pub. Date: Feb. 23, 2006

(65) Prior Publication Data
US 2008/0004046 A1   Jan. 3, 2008

Related U.S. Application Data

(60) Provisional application No. 60/601,316, filed on Aug. 14, 2004.

(51) Int. Cl.
*H04W 16/18* (2009.01)
(52) U.S. Cl.
USPC ........... 455/466; 455/403; 370/328; 370/349; 348/14.01
(58) Field of Classification Search
USPC ...................................... 455/466; 348/14.01
See application file for complete search history.

(56) References Cited

U.S. PATENT DOCUMENTS

| | | | | |
|---|---|---|---|---|
| 5,794,142 | A * | 8/1998 | Vanttila et al. | 455/419 |
| 6,385,461 | B1 * | 5/2002 | Raith | 455/518 |
| 7,184,786 | B2 * | 2/2007 | Mumick et al. | 455/466 |
| 7,725,116 | B2 * | 5/2010 | Mumick et al. | 455/466 |
| 2001/0049603 | A1 * | 12/2001 | Sravanapudi et al. | 704/270.1 |
| 2002/0086659 | A1 * | 7/2002 | Lauper | 455/404 |
| 2002/0119793 | A1 * | 8/2002 | Hronek et al. | 455/466 |
| 2002/0146097 | A1 * | 10/2002 | Vuori | 379/88.22 |
| 2002/0173319 | A1 * | 11/2002 | Fostick | 455/466 |
| 2003/0193951 | A1 * | 10/2003 | Fenton et al. | 370/392 |
| 2004/0019487 | A1 * | 1/2004 | Kleindienst et al. | 704/270.1 |
| 2004/0058694 | A1 | 3/2004 | Mendiola et al. | |

(Continued)

*Primary Examiner* — Lester Kincaid
*Assistant Examiner* — Diego Herrera
(74) *Attorney, Agent, or Firm* — Ash Tankha; Lipton, Weinberger & Husick

(57) ABSTRACT

Methods for combining speech with existing text wireless Short Message Service (SMS) to create a multimodal SMS service are provided. A user of standard SMS text service is provided with a link within each message that allows adding or retrieval of a voice message associated with an SMS text message. A speech server in the wireless network may be used for recognition of voice commands, rendering of test into speech, and recording or playing back voice recordings. An automatic and unique identification of each message is created to allow retrieval of the message without manually selecting the message. Additional services include message lists, integration with voicemail systems, image and video messages, cross-functional applications with Multimedia Messaging Services (MMS) and Enhanced Message Services (EMS), and extensions of the combination of voice with text SMS to other computing devices such as PDAs and PCs.

20 Claims, 5 Drawing Sheets

(56) References Cited

U.S. PATENT DOCUMENTS

| | | |
|---|---|---|
| 2004/0110462 A1 | 6/2004 | Forstadius |
| 2004/0131081 A1 | 7/2004 | Bhatia et al. |
| 2004/0185883 A1* | 9/2004 | Rukman ............... 455/466 |
| 2004/0199649 A1* | 10/2004 | Tarnanen et al. ........... 709/230 |
| 2004/0244102 A1* | 12/2004 | Benzon et al. ............... 4/420 |
| 2005/0003838 A1* | 1/2005 | McCann et al. ............ 455/466 |
| 2005/0037762 A1* | 2/2005 | Gurbani et al. ............ 455/445 |
| 2005/0050144 A1* | 3/2005 | Borin ............... 709/206 |
| 2005/0070314 A1* | 3/2005 | Wilson ............... 455/466 |
| 2005/0096069 A1* | 5/2005 | Lee ............... 455/456.5 |
| 2005/0111041 A1* | 5/2005 | Salmi et al. ............ 358/1.18 |
| 2005/0136955 A1* | 6/2005 | Mumick et al. ............ 455/466 |
| 2005/0187773 A1* | 8/2005 | Filoche et al. ............ 704/260 |
| 2005/0266831 A1* | 12/2005 | Roth ............... 455/412.1 |
| 2005/0266863 A1* | 12/2005 | Benco et al. ............ 455/466 |
| 2007/0082686 A1* | 4/2007 | Mumick et al. ............ 455/466 |
| 2008/0004046 A1* | 1/2008 | Mumick et al. ............ 455/466 |

\* cited by examiner

METHODS FOR IDENTIFYING MESSAGES AND COMMUNICATING WITH USERS OF A MULTIMODAL MESSAGE SERVICE

CROSS-REFERENCE TO RELATED APPLICATION

This application claims the benefit of U.S. Provisional Application No. 60/601,316, entitled "Methods for Identifying Messages and Communicating with Users of a Multimodal Message Service," filed Aug. 14, 2004.

FIELD OF THE INVENTION

The present invention relates generally to sending and receiving of short messages between wireless telephony users. More specifically, the present invention relates to the addition of speech capabilities to standard text messaging systems to create a multimodal SMS (short message service) service with the capability of uniquely identifying the messages and users in such a service.

BACKGROUND OF THE INVENTION

In addition to the usual wireless telephony provided by cellular telephones, such devices are also widely used for sending short text messages (under the name Short Message Services or SMS) between wireless users.

More recently, new devices and supporting network services are being introduced that allow a more general class of messages to be sent between wireless devices, where the messages include voice, still images, and even moving images. Standards have been introduced for such services including Multimedia Message Services (MMS) and Enhanced Message Services (EMS).

However, as attractive as such new services are to users and wireless network providers, they require new and expensive wireless devices, of which few have been deployed to customers, as well as extensive additional network capabilities. Further, these new services do not inter-operate with existing SMS services in a seamless manner.

In view of the foregoing discussion, there is a need for a system that overcomes the drawbacks of these new services and provides comparable advanced capabilities using only the inexpensive devices and networks currently available to support standard text SMS and that seamlessly inter-operates with SMS services. Further, it is desirable for such a system not to be limited to wireless phones, but to also work with wireline phones with SMS capabilities and services over such wireline devices.

A related service is described in U.S. Patent Application Publication No. 2005-0136955, published Jun. 23, 2005, entitled "Techniques for Combining Voice with Wireless Text Short Messages," the content of which is incorporated be reference herein. In order to implement this service further, it is desirable for there to be an ability to store and access the messages created by the service and to be able to intercept user SMS text messages for insertion of the additional information into the text messages to allow the service to operate.

Further still, it is desirable that there be methods to provide inter-working with other services such as voice mail, multimedia messaging service, and instant messaging (IM).

SUMMARY OF THE INVENTION

The present invention provides a multimodal SMS mechanism combining speech, or other modalities (such as image or video data), with standard text SMS. This mechanism allows users to send and receive voice messages associated directly with text SMS messages. The mechanism can be applied using standard wireless telephone devices capable of sending and receiving SMS text messages and can be extended to many other device types and network technologies.

A short message service center (SMSC) provides a standard mechanism for transmitting SMS text messages. A SMSC is understood by those in the art to cover other components, such as a message center (MC) used in IS-41 networks or variations on such processors, e.g. those provided by BMD Wireless as part of their SMS message platform products. Accordingly, as used herein, the term "SMSC" has a broader meaning than just the component SMSC. A SMSC may be used to transmit or insert the link into the text messages that allow connection to the speech server. A multimodal platform, which may be the Kirusa Multimodal Platform (KMMP) provided by Kirusa, Inc., of Edison, N.J., U.S.A., provides control and synchronization of modalities as needed.

According to the present invention, an automatic and unique identification of each message is stored at the multimodal platform without requiring the user to manually select the message for retrieval; and the required links are inserted into selected user text messages, allowing for such retrieval without requiring every text SMS message transiting the service network to be handled by the multimodal platform.

To identify stored messages, each message is assigned a service identifier (e.g. a telephone number) which is combined with a unique identifier of the receiving user (e.g. that user's telephone number). It is possible to use only a limited number of such message service identification numbers (only the number of messages to be stored for each user) since the combination of the user identifier with one of the message identifiers (which can be same for each user) provides a fully unique message identifier. Since service identifiers can be a scarce resource in a telephone or data network, this method allows scaling of the service usage indefinitely without requiring additional service identification numbers. The present invention provides several embodiments for inserting the message identification links into the text SMS messages.

Additionally, the invention provides for the use of message center filtering to identify off-network users of the multimodal SMS and to allow them to send voice SMS messages. Methods for inter-working with MMS and methods for inter-workikng with other standard message systems such as voice mail or IM are also provided.

Other features are described below.

BRIEF DESCRIPTION OF THE DRAWINGS

The foregoing summary, as well as the following detailed description of the preferred embodiments, is better understood when read in conjunction with the drawings attached. For the purpose of illustrating the invention, example construction of the invention is shown; however, the invention is not limited to the specific method and instrumentalities disclosed. In the drawings.

DETAILED DESCRIPTION OF ILLUSTRATIVE EMBODIMENTS

Figure 1:
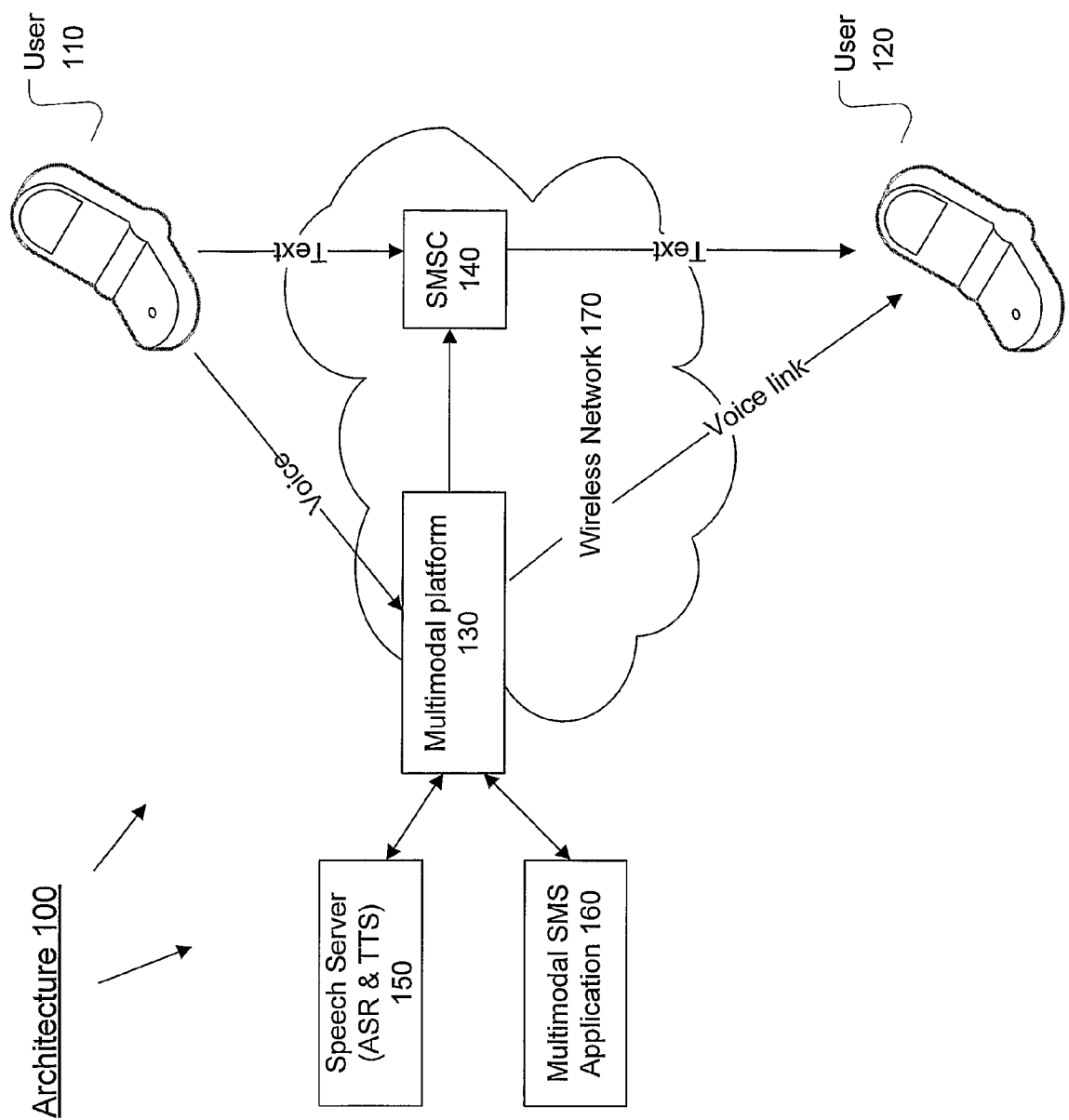
FIG. 1 is a flow and architecture diagram showing, by way of example, how a multimodal SMS is created by a user device, transmitted through the network, and received by a second user device.

An example overall architecture 100 for transmission of multimodal SMS messages is shown in FIG. 1. An initiating user 110 of the multimodal SMS service creates a voice message by directly calling the multimodal platform 130 (or by replying to a previous multimodal SMS or text SMS) and following the provided multimodal SMS prompts to create a voice recording. After the recording is completed and stored at the multimodal platform 130, a text SMS is sent to the receiving user 120, notifying them that a voice message has been recorded and providing a link, which can be activated to listen to the message. The text message may also contain additional content provided by the sender.

It should be noted that the link embedded in an SMS message can be created at the receiving device or by using the multimodal platform 130, or by using a modified SMSC 140. In a preferred embodiment of the invention, the multimodal platform 130 adds the links.

A system according to the invention preferably includes one or more of the following components: user input and/or output devices including those capable of pickup and playback of speech and those capable of entering and displaying text information; a speech server 150 with additional capabilities of recording and playing back recorded voice; a text-to-speech (TTS) server, which is part of the speech server 150, for rendering text into spoken words; and a multimodal SMS application 160 for the multimodal SMS service that uses the speech server to combine speech with text messages created using one of the input devices and sending such combined messages to a device that provides one or more of the output capabilities. The system also may include other network components such as a Short Message Service Center 140 (SMSC) and a Multimodal Platform 130.

The text input device is used to compose a message to be sent using standard SMS technology. The multimodal SMS application 160 combines the text message (if any) with a link to a spoken message, if desired by the user, using a message identifier. The combined message is sent to recipient(s) who then can read the text message and retrieve, from the multimodal SMS application 160, the associated voice message through the message identifier. The speech server 150 may be used for easy control of the playback and recording of voice messages as well as the control of other useful messaging function.

In order to provide access to the individual messages stored for a user, the present invention provides for the insertion of an appropriate message identifier (e.g. a number assigned from a network pool) into an SMS message, wherein the message is sent to the user or received from the user (e.g. initiating user 110 or receiving user 120). Depending on how the SMS message is initiated, different methods for inserting the link are necessary.

Figure 2:
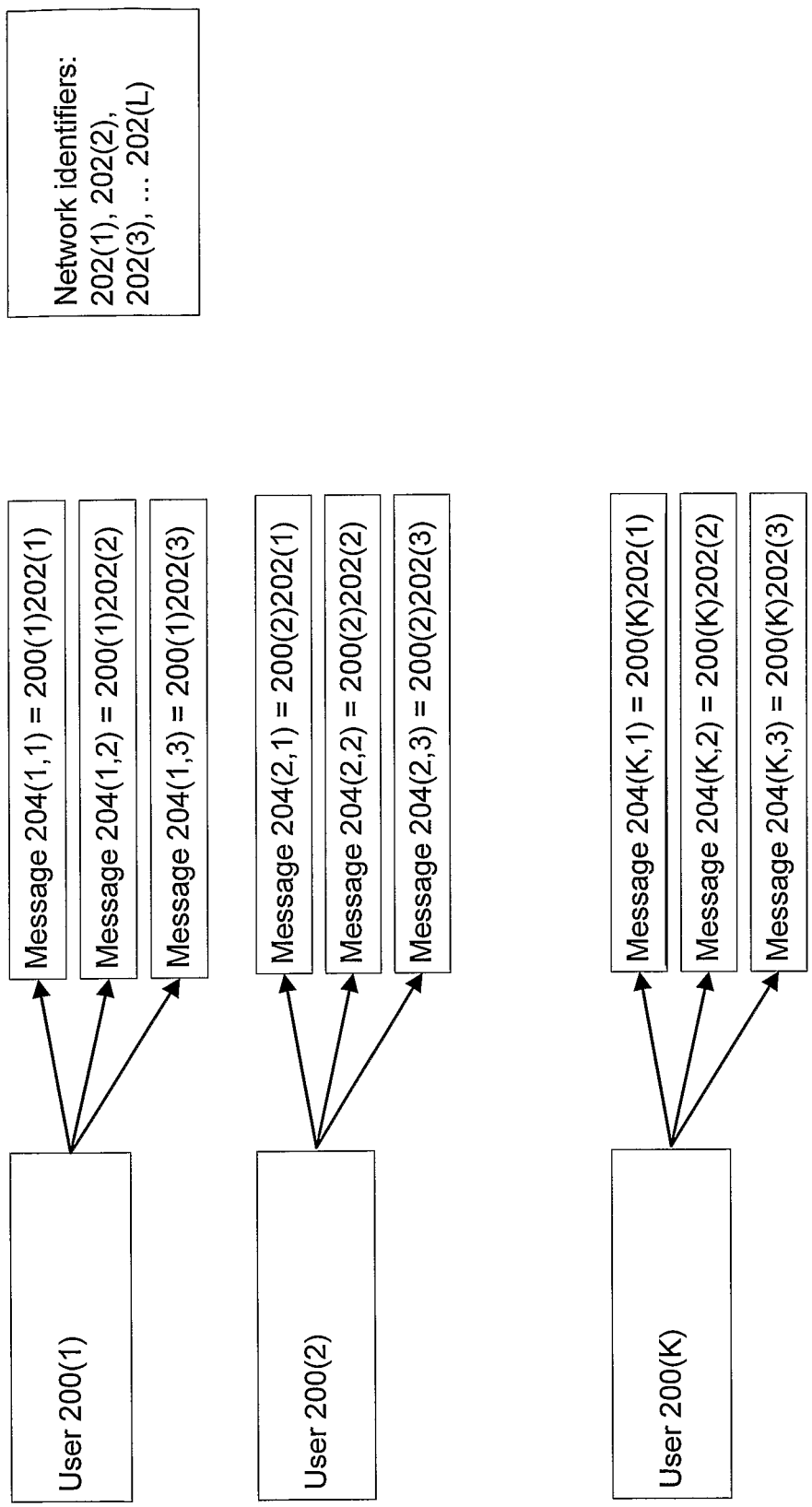
FIG. 2 is a block diagram of an example structure showing the storing and identification of messages in accordance with the present invention.

FIG. 2 is an illustration of an example structure showing how a voice message 204 stored on a media platform is identified with a specific user 200. A user identifier, 200(1) through 200(K) for K users, is combined with a network identifier 202 (e.g. a telephone number), 202(1) through 202 (L) where L can be a relatively small number such as 100) so that each message 204 left for a particular user 200 is uniquely identified by this combination. For example, a first message 204 left for user 200(1) is combined with the network identifier 2021) and is then identified as message 204(1,1), wherein (1,1) denotes user 200(1) and network identifier 202 (1), respectively.

Only a small number of network identifiers are needed to provide for a reasonable number of messages stored for each individual user. For example, if 100 network numbers are provided, 100 messages can be stored for each user each of which can then be retrieved by that user as desired. The message can be retrieved based on the user's identification and the number of the message requested.

In this example if more than 100 messages are received by a user, the next message will then overwrite the first message in the sequence. This implementation is usually called a 'circular buffer' in the art. The size of the buffer is controlled by the size of the network identifier pool. Hundreds of identifiers is a reasonable size of the pool providing sufficient temporary storage locations for a large number of voice messages for each individual user. In addition to overwriting messages in the circular fashion described above, it is also possible to use other criteria to determine which previous message to overwrite (e.g. which message was least recently accessed).

In one specific implementation, where the user's telephone number is the user identifier, this number can usually be determined automatically, using network Automatic Number Identification (ANI) a standard network function, without need for the user to provide any identifier as long as they are using the device to which the original message was directed.

If ANI is not available, or a user wishes to retrieve a message from another device with a different number, in a further inventive concept, the user can provide their original device number by manual entry (by voice or through a touch-pad or keyboard). Further security can be provided by adding some form of personal identification (PIN) number to the request.

Further, the specific message can be identified by associating the number supplied by the network pool with an actual telephone number. If the user dials this number to access their message the telephone system can automatically provide the dialed number to the application using called number identification (Dialed Number Identification System or DNIS).

The result of these two automatic procedures is that, if the user is provided with a link (e.g. within an SMS message) to the appropriate network pool number the application can identify the requested message completely automatically, without any user intervention, advantageously requiring the user to simply activate ('click') the link to access their message.

The present invention is directed to five scenarios for inserting the link into a text SMS message, wherein the message is either sent to or from a user (e.g. initiating user 110 or receiving user 120) of the multimodal SMS service, back to the multimodal platform 130 for retrieval or recording of a voice message. The five scenarios are described in more detail below in conjunction with FIGS. 3-7, wherein like numerals refer to like elements throughout FIGS. 3-7.

Figure 3:
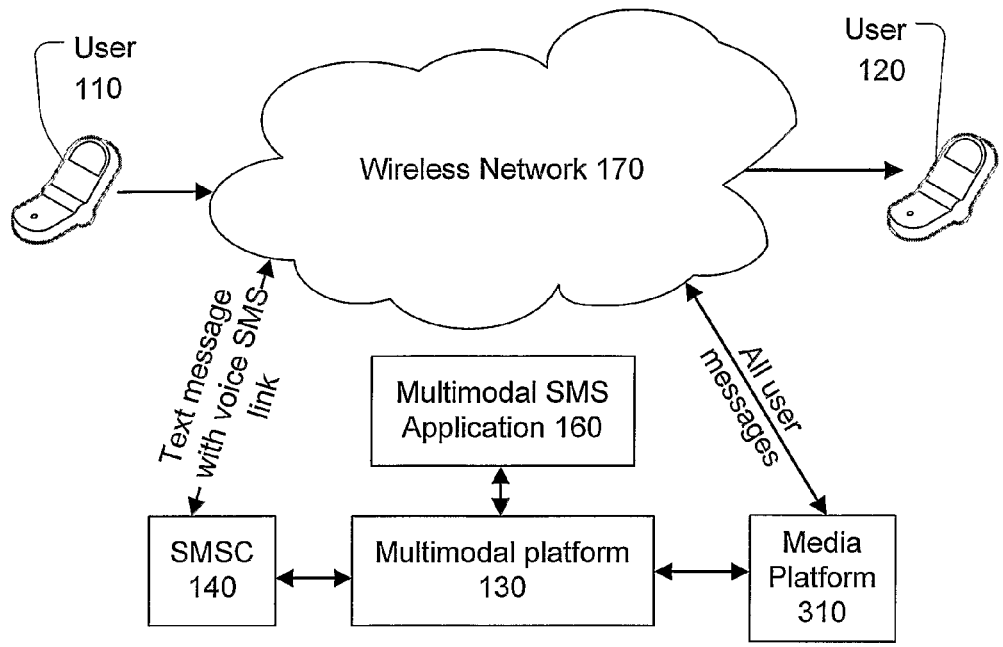
FIG. 3 is a block diagram of a first example embodiment of delivering, storing, and identifying multimodal SMS messages in accordance with the present invention.

In scenario 1, as illustrated in the block diagram of FIG. 3, all messages are stored on a media platform 310. In this particular embodiment, all messages are initiated by voice and all replies are made by voice. An initiating user 110 creates a message by calling an assigned network number for the multimodal platform 130. The multimodal SMS application 160 then generates a text SMS containing a link, which when activated (e.g. by clicking on the phone number) allows the receiving user 120 to call the multimodal platform 130 in order to retrieve the voice message. The message created by the user 110 may or may not contain text SMS. Optionally, while retrieving the voice message the receiving user 120 can reply by voice, thereby continuing an exchange of voice messages.

In this embodiment, the network pool number (i.e. the message identifier) associated by multimodal SMS with the recording can be added automatically to a text SMS message sent directly to the receiving user 120. In most cases, current devices are capable of dialing a number within such an SMS message and the user can retrieve the voice message as described above.

If said user 120 then wishes to reply to the message by voice, after listening to it using the multimodal platform 130 and the multimodal SMS application 160, exactly the same process is followed with the SMS message now sent to the originator of the first message (user 110) with a link back to the newly created voice message assigned an appropriate number from the network pool for this user.

This process can be repeated indefinitely with no additional concepts required except that when the network pool is exhausted for one of the users the network pool numbers are reused and old messages are discarded as described above.

Figure 4:
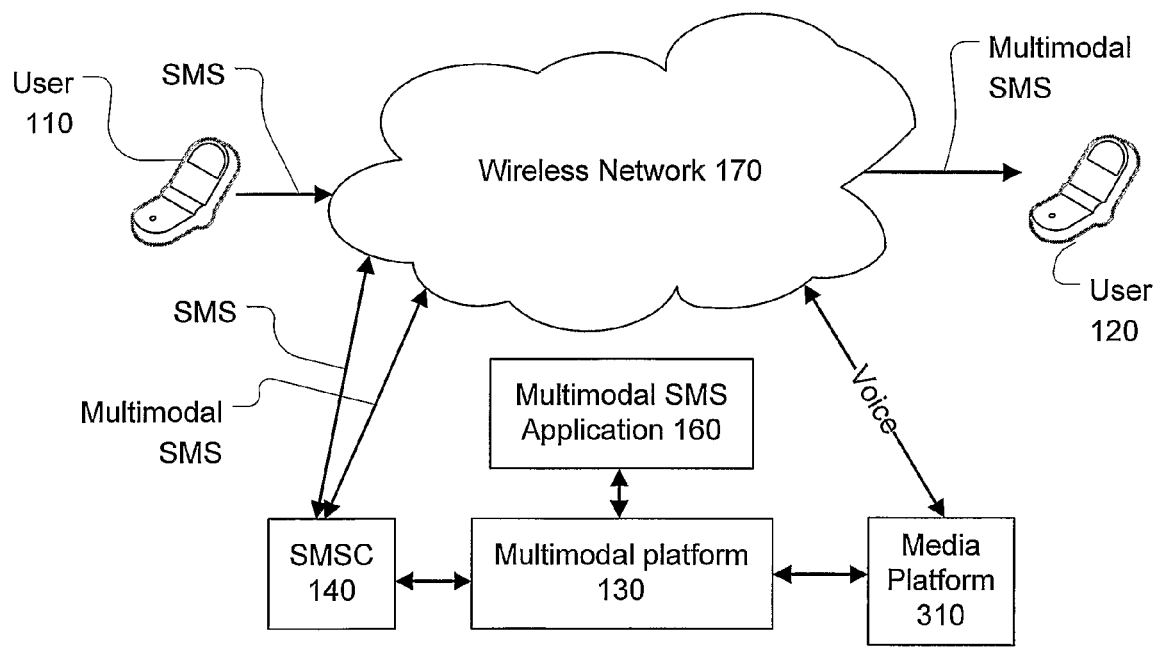
FIG. 4 is a block diagram of a second example embodiment of delivering, storing, and identifying multimodal SMS messages in accordance with the present invention.

Another embodiment of the present invention, scenario 2, is illustrated in the block diagram of FIG. 4. A desirable feature of the present invention allows any multimodal SMS user to whom a text SMS message is sent (e.g. receiving user 120) to reply either by text or by voice. This may be accomplished by adding a link to the multimodal platform into all text SMS messages received by the multimodal SMS user.

In this embodiment, each user of the service is assigned a virtual service identifier (or VMN, virtual mobile number) different from and in addition to the standard identifier provided by the network (e.g. their telephone number). Messages sent to the VMN terminate on the multimodal platform 130, where any required links may be inserted and the messages forwarded, with the link in place, to the standard identifier. The added link allows the receiving user 120 to contact the multimodal platform 130 and use the multimodal SMS application 160 to record a voice reply to the text SMS message.

When an SMS message is sent to this virtual number, the SMS message is received by the multimodal platform 130, and the multimodal SMS application 160 associates the virtual number with the recipient. The text SMS message is stored by the multimodal platform 130 with a number assigned from the network pool combined with the recipient's identifying number (which, in a preferred embodiment, is their standard telephone number) to uniquely identify the message. A link to the network pool number is inserted into the text SMS message sent to the receiving user 120 so that the receiving user 120 can automatically reply to the message (and, if desired, have the text SMS message read back vocally using Text-to-Speech (TTS) component of the Speech Server 150, which is part of the media platform 310) with a voice message. Optionally, the receiving user 120 may reply to the text SMS with a direct text SMS of their own.

Figure 5:
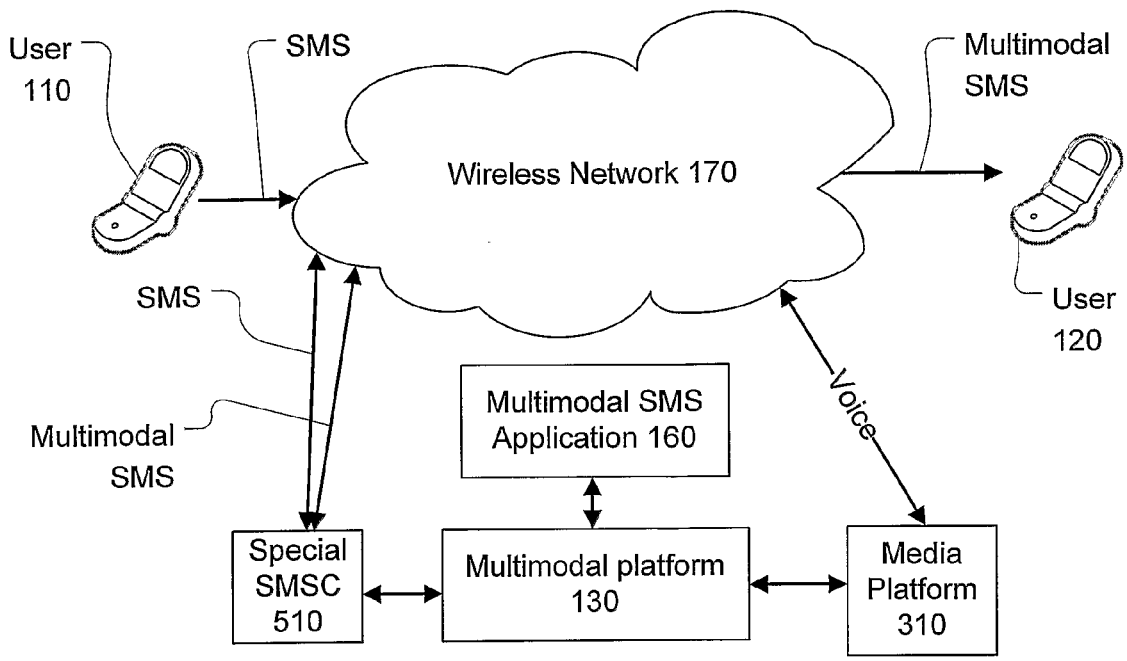
FIG. 5 is a block diagram of a third example embodiment of delivering, storing, and identifying multimodal SMS messages in accordance with the present invention.

Yet another embodiment (scenario 3) is illustrated in the block diagram of FIG. 5. If there are a large number of users to the multimodal SMS messaging service, then the assignment of a virtual number may not be practical. Furthermore, it is also advantageous if a user can be identified by a single number rather than having a virtual number in addition to their regular telephone number.

In this embodiment, all users of the multimodal SMS service are automatically connected to a special SMSC 510. The special SMSC 510 intercepts all incoming text SMS messages sent from an initiating user 110 to a defined subset of the receiving users 120. The special SMSC 510 then either inserts the necessary links itself or forwards the text SMS message to the multimodal platform 130 for modification. The same processing as described above in relation to FIG. 4 (scenario 2) applies except the virtual number is not required as the special SMSC 510 directs the SMS message to the users. Again, the receiving user may reply either by text or by voice in this embodiment of the invention.

Figure 6:
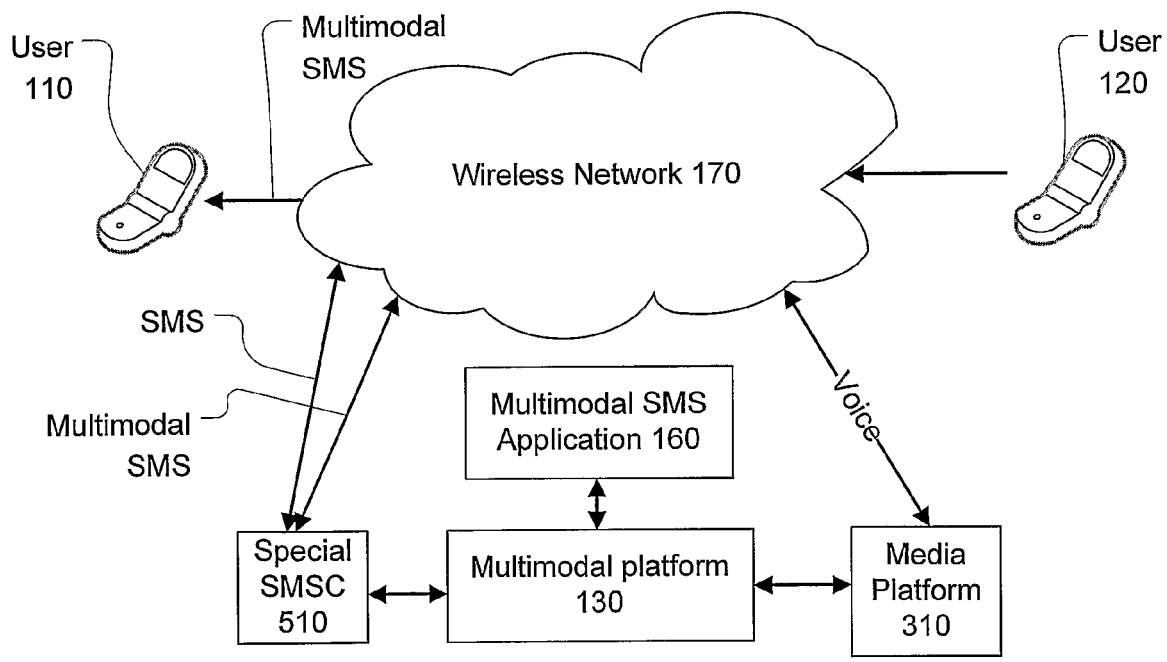
FIG. 6 is a block diagram of a fourth example embodiment of delivering, storing, and identifying multimodal SMS messages in accordance with the present invention.

In yet another embodiment of the present invention (scenario 4), the special SMSC 510 for the particular user's device automatically intercepts all outgoing messages from the user and either inserts the required links itself or forwards the text SMS message to the multimodal platform 130 for modification. This embodiment, as illustrated in FIG. 6, is similar to scenario 3 except that only outgoing messages from the defined subset of users are intercepted and the multimodal SMS link added. Scenario 3 and scenario 4 may be combined to assure that, if desired, all messages to and from a defined subset of users will contain the multimodal SMS link.

The interception of ingoing and/or outgoing messages from a defined subset of users may be performed by several different mechanisms. In one example, in a GSM network, the user device may be reprogrammed to target a specific SMSC 140, which is programmed to add the appropriate multimodal SMS link. In another example, the Message Centers (MC) in an IS-41 network can be programmed to provide special handling of messages directed to specific users. Once intercepted, the appropriate multimodal SMS link to the multimodal platform 130 may be added at the modified MC or the message can be forwarded to the multimodal platform 130 for modification by adding the multimodal SMS link.

Figure 7:
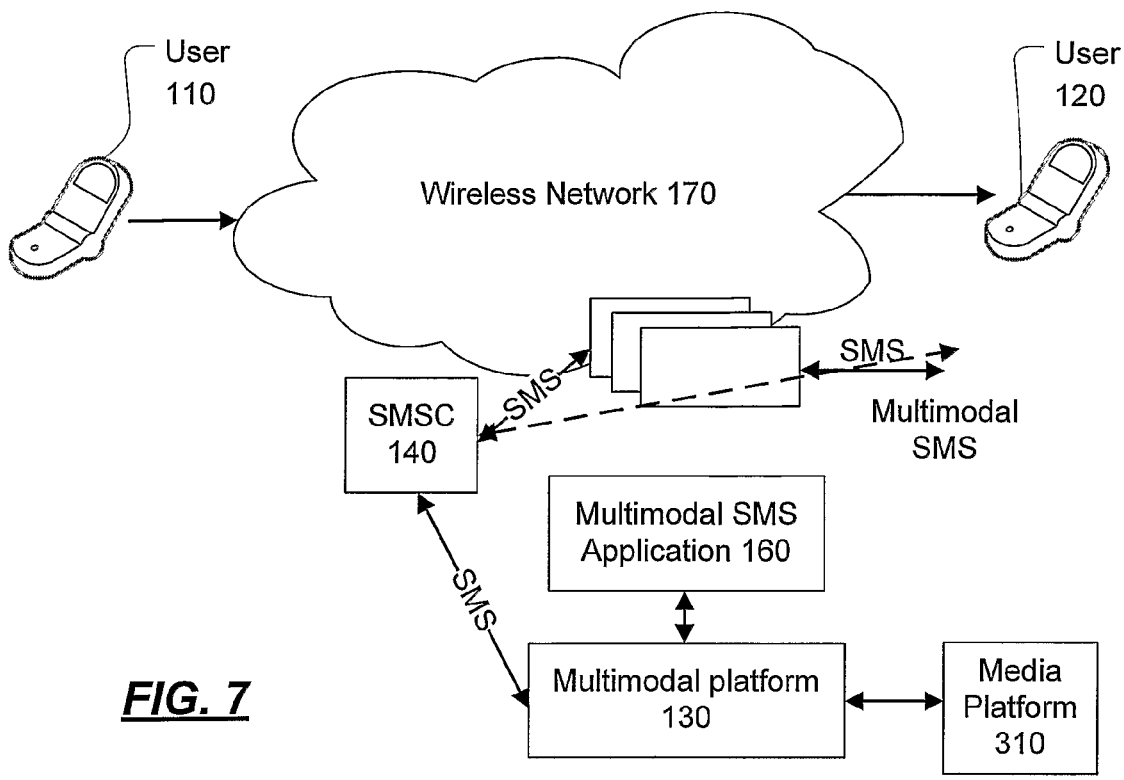
FIG. 7 is a block diagram of a fifth example embodiment of delivering, storing, and identifying multimodal SMS messages in accordance with the present invention.

The present invention also provides for the automatic conversion of all text SMS messages into multimodal SMS messages by inserting a link to the multimodal platform 130. This embodiment (scenario 5), as illustrated in FIG. 7, allows for all text SMS messages to be replied to by voice with use of the multimodal SMS application 160. This option may be desirable if there is no need to define a subset of users. This is accomplished either at the SMSC 140 or by diverting all text SMS traffic to an instance of the multimodal platform 130.

Figure 8:
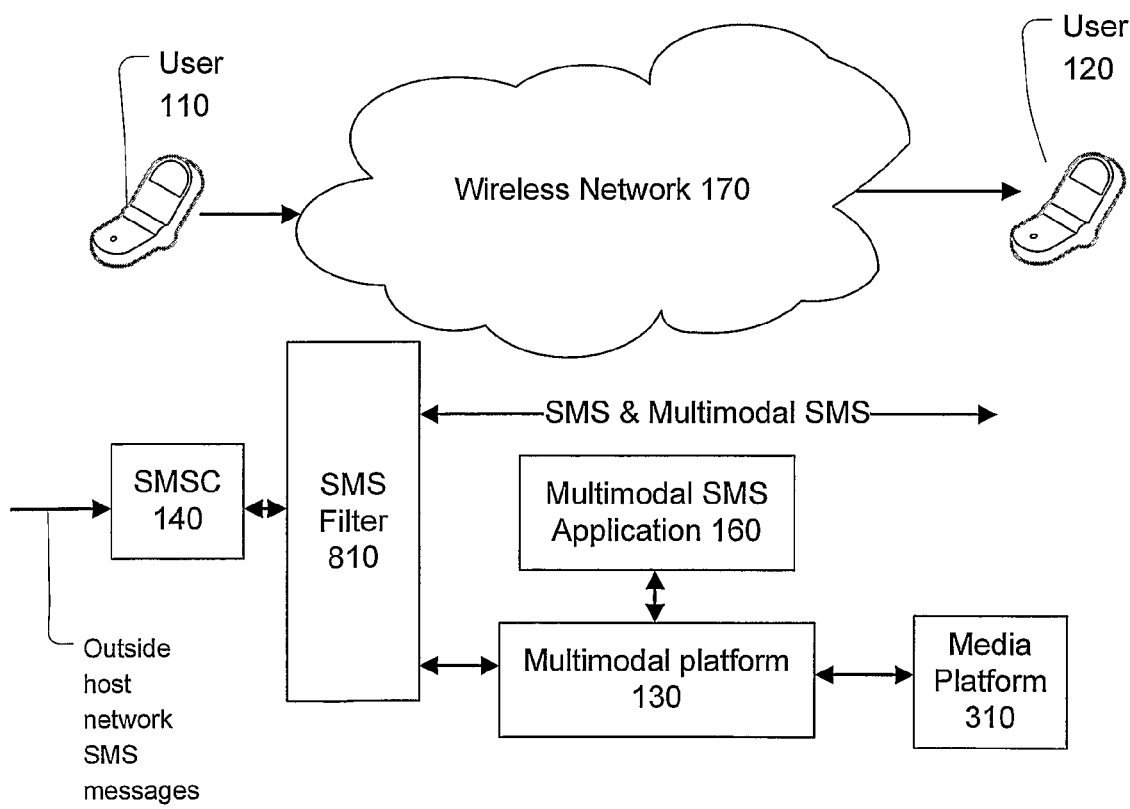
FIG. 8 is a block diagram of an embodiment showing how users outside of the primary host network may send and receive multimodal SMS messages in accordance with the present invention.

Multimodal SMS message users who are not using the primary host network (e.g. a second telephony carrier) may be allowed to send and receive multimodal SMS messages using the multimodal platform 130. This embodiment is further described in conjunction with FIG. 8 A SMS filter 810 is provided for filtering each message (as is done already by products used in removing unwanted SMS messages—SPAM) to determine if the user is a multimodal SMS subscriber. After filtering the multimodal SMS link is then added. If SPAM filtering (or some other network filtering mechanism) is enabled in a network, the same mechanism used for detecting SPAM can also be used to detect and intercept messages from off-network. These could then be rewritten with the multimodal SMS link added for the desired users, and sent on their way.

Subscribers and Non-Subscribers

A further feature of the present invention provides different capabilities for 'subscribers' and 'non-subscribers.' A subscriber is a member of a subset of network users who the network carrier, such as the carrier of wireless network 170, may designate for special services (for which a separate fee may be charged).

According to aspects of the invention, the initial sender (e.g. user 110) of a multimodal SMS message should be a subscriber; however, the receiver (e.g. user 120) of such a message need not be a subscriber. Storage for the voice and text SMS messages sent to the non-subscribing receiver is created dynamically with a possible limitation on size and on retention time (e.g. before the messages are removed from the server). An accounting system may track the number of subscribed users as well as the number of non-subscribed users receiving messages.

Upon initial provisioning of a subscriber, an automatic 'welcome' multimodal SMS message is sent, inviting the new subscriber to activate a link in the message and record their name. This recorded name can then be associated with messages sent by this user in the future.

The invention provides for multimodal SMS messages to be sent to a group or a mailing list as desired. The mailing list may be stored in the network (e.g. wireless network 170) or the user device or any combination of the two.

The invention also provides the ability to access and reply to all new, unheard multimodal SMS messages for a user 120 in one single access call to a predetermined telephone number. In addition, the predetermined telephone number may be used to access and reply to old multimodal messages (those that have previously been heard) in a single access call.

Inter-working with Voice Mail

The multimodal SMS service also allows, in an embodiment of the invention, inter-working with standard voice mail systems, whose capabilities depart from currently available systems. In particular, the invention provides the ability to reply to a voice mail by SMS. In an example implementation, a caller leaves a voice mail (VM) for a user. After recording, the VM system automatically sends a multimodal SMS message to the VM user. The user receives the message and clicks on the multimodal SMS link to hear the VM. When listening to the VM, the VM system can allow the user to send a reply multimodal SMS message. A menu is presented to the user, allowing the user to record a message. The message is then sent, to the person who left the original voicemail, as a multimodal SMS message. If the recipient has a mobile phone (or SMS-capable fixed phone), the message is sent as a multimodal SMS message. However, if the recipient has a fixed device without SMS capability, the message is delivered by making an automatic voice call to the fixed device.

It is also possible for multimodal SMS to be modified to substitute for VM. In an example implementation, user 110 calls user 120, and user 120 does not pick up. According to the invention, the call is then directed to the multimodal SMS number of user 120, allowing user 110 to leave a multimodal SMS message. User 120 then receives the SMS message (text SMS), and user 120 can listen to the message or reply to user 110 (by using the reply feature of SMS, without having a double pin call architecture) by voice or by text.

Inter-working with MMS

Further embodiments of the invention provide for the inter-working of multimodal SMS with multimedia message services (MMS) and allow the conversion of MMS to multimodal SMS and the use of multimodal SMS to send MMS messages to MMS users.

If a multimodal SMS user desires to send an MMS message (e.g. to a user who prefers to receive MMS messages rather than SMS messages) the multimodal platform 130 is notified and conversion to MMS is carried out transparently to the user by the platform. The multimodal platform 130 constructs a MMS message using the defined standards for MMS by combining any text portion of the multimodal SMS and the voice portion, or other media material, into a single MMS construct which is then sent to the desired recipient.

If the multimodal platform 130 receives a MMS message for a multimodal SMS user, the multimodal platform 130 divides the message into multimedia component parts (e.g. text, voice, and image) and sends, in an appropriate manner, each component to the multimodal SMS user. As an example implementation, the text portion is converted into a standard SMS text message with a multimodal SMS link to the multimodal platform 130 media server so the user can retrieve the voice portion of the message. If there are other media present, links can also be presented to the multimodal SMS user and the other media retrieved using an appropriate device.

Inter-working with IM

Many mobile instant message (IM) services are based on SMS. If an IM is sent to a mobile device, it is delivered as a SMS. The mobile user then responds with SMS. In accordance with an embodiment of the invention, a multimodal SMS link can be added to the SMS reply message. The multimodal platform 130 detects the fact that the SMS is directed to an IM platform and automatically adds the multimodal SMS link pointing to the non-text portion of the message (e.g. a voice link). Since the IM platform is in the path of the messages anyway, special addressing or a modified SMSC is not required. The voice reply is then delivered as a voice link or as a way file to a desktop computer and as a multimodal SMS link if the recipient is a mobile phone.

Inter-working with Outcalling

Many voice message systems currently use outcalling to provide information to recipients. Currently, such information is delivered to a recipient as a voice call, which can be intrusive as well as expensive. In accordance with an embodiment of the invention, a multimodal SMS message may be sent to the intended recipient. If the recipient then wishes to access the message, the recipient activates the link in the multimodal SMS message and is connected to the multimodal platform 130. In this embodiment, voice information is non-intrusively delivered to the recipient. If the recipient's phone is not SMS capable, then normal outcalling may be used.

Addressing of Multimodal SMS Messages

If a user (e.g. user 110) wishes to initiate a multimodal SMS voice message, that message, once recorded, is normally addressed to the recipient (e.g. user 120). According to further aspects of the invention, the recipient's user designation (e.g. telephone number) can be entered in order to address the message to the recipient. In addition, a network address book (either a general address book provided by the network operator or one associated with the multimodal platform 130) can be used to enter the address either by searching on part of the number or by entering or searching on the recipient's name. A further option for addressing the message is that a SMS message may be sent to the sender requesting the recipient's address (e.g. telephone number). The number(s) may be entered using an address book on the user's device and sent as a reply to the multimodal platform 130. Once received by the multimodal plattorm 130, the provided address is then used to send the multimodal SMS message to the desired recipient (or list of recipients).

Furthermore, additional information (other than the message and identifier) may be added to the body of the multimodal SMS message in order to distinguish various multimodal SMS messages received by a user. Examples of additional information include, but are not limited to, time and date of message transmission, length of audio recording, or information helpful in identifying the message (e.g. the first few words of the original text message).

Billing Mechanism

A billing mechanism for retrieving a SMS message and replying to the SMS message is provided in an additional embodiment of the present invention. In order to charge a user an appropriate fee for replying to a SMS message, each access or call to the link to create a reply message may result in the fee being charged to the user. Additionally, the mechanism may also provide a free access number for simply listening to new messages for a first time but may not allow the option to reply to the message when accessed by the free access number.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of communicating a multimodal message in a multimodal SMS communication, the method comprising:
    creating a voice message by recording said voice message on a multimodal platform;
    generating an SMS message containing a link to the voice message on the multimodal platform, wherein said link when activated allows a recipient to retrieve the voice message;
    assigning a unique message identifier to the voice message stored on the multimodal platform, wherein each said message identifier comprises a single recipient identifier combined with one of a predefined number of network identifiers for uniquely identifying each said voice message for each recipient, wherein the message identifier is assigned by a network pool, and wherein the unique message identifier is associated with the recipient;
    adding the message identifier to the SMS message;
    storing the message identifier with the SMS message; and
    transmitting the SMS message to the recipient via a connection that comprises a wireless network for notifying said recipient of said voice message and for providing said link to said recipient;
    wherein the multimodal message contains audio, text, or both audio and text.

2. The method of claim 1, further comprising: accessing the SMS message by activating the link.

3. The method of claim 2, wherein the SMS message is a message from a voice message system.

4. The method of claim 1, wherein the outgoing message of the recipient in reply to the SMS message comprises a text message, a voice message, or a combination thereof.

5. The method of claim 4, wherein the outgoing message is intercepted by an SMS center if the recipient is part of a defined subset of recipients, wherein the SMS center insets a link to the multimodal platform into the intercepted message or forwards the intercepted message to the multimodal platform for modification.

6. The method of claim 1, wherein the audio message is a voice mail message and wherein the link allows access to the voice mail message.

7. The method of claim 1, wherein the message contains audio and wherein the step of creating the message comprises: calling an assigned network number; and speaking the desired message.

8. The method of claim 1, wherein the step of transmitting the SMS message comprises: sending the SMS message to a virtual service identifier number, wherein the SMS message is directed to a multimodal platform.

9. The method of claim 8, wherein the multimodal platform associates the virtual service identifier number with the recipient.

10. The method of claim 1, wherein the step of transmitting the SMS message comprises: an SMS center intercepting the SMS message sent to the recipient if the recipient is part of a defined subset of recipients, wherein the SMS center insets a link into the intercepted message or forwards the intercepted message to the multimodal platform for modification.

11. The method of claim 1, wherein the SMS message is converted into a multimodal SMS message.

12. The method of claim 1, further comprising: filtering the SMS message to determine if the sender of the text SMS message is a subscriber to a multimodal SMS service.

13. The method of claim 1, wherein a sender of the SMS message is a subscriber to a network carrier responsible for sending and delivering the message.

14. The method of claim 1, further comprising: converting the SMS message to a multimedia message, comprising dividing the text message into multimedia components.

15. The method of claim 1, further comprising: adding a multimodal SMS link to a non-text portion of the message, if the outgoing message is directed to an instant message platform.

16. The method of claim 1, further comprising: retrieving the SMS message by one of (i) activating the link and (ii) calling an access number, wherein the retrieval of the SMS message may result in a predetermined charge to the recipient.

17. The method of claim 1, wherein said link when activated allows a recipient to provide an outgoing message in reply to the SMS message.

18. A non-transitory computer-readable medium having computer-executable instructions to perform a method of communicating a message in a multimodal SMS communication, the method comprising:
    creating a voice message by recording said voice message on one or more of a multimodal platform and an associated speech server;
    generating an SMS message containing a link to the voice message on the multimodal platform, wherein said link when activated allows a recipient to retrieve the voice message;
    assigning a unique message identifier to the SMS message stored on the multimodal platform, wherein each said message identifier comprises a single recipient identifier combined with one of a predefined number of network identifiers for uniquely identifying each said voice message for each recipient, wherein the message identifier is assigned by a network pool, and wherein the unique message identifier is associated with the recipient;

adding the message identifier to the SMS message;

storing the message identifier with the SMS message; and transmitting the SMS message to the recipient via a connection that comprises a wireless network for notifying said recipient of said voice message and for providing said link to said recipient;

wherein the message contains one of audio, text, and a combination thereof.

19. The computer-readable medium of claim 18, wherein said link when activated allows a recipient to provide an outgoing message in reply to the SMS message.

20. The computer-readable medium of claim 18, wherein the method further comprises: accessing the SMS message by activating the link.

\* \* \* \* \*